United States Patent [19]

Goodman et al.

[11] Patent Number: 5,633,782

[45] Date of Patent: May 27, 1997

[54] DOCKING STATION FOR A PORTABLE COMPUTER WITH A HINDGED SUPPORT FRAME AND MOVABLE RECEPTACLE ASSEMBLY

[75] Inventors: Walter A. Goodman, Binghamton; Charles R. Hatton, Endicott; John H. Sherman, Glen Aubrey; Paul A. Wormsbecher, Endwell, all of N.Y.

[73] Assignee: International Business Machines Corporation, Armonk, N.Y.

[21] Appl. No.: 597,965

[22] Filed: Feb. 7, 1996

Related U.S. Application Data

[62] Division of Ser. No. 303,916, Sep. 9, 1994, Pat. No. 5,552,957.

[51] Int. Cl.[6] ................................................ H05K 7/00
[52] U.S. Cl. .................... 361/683; 361/686; 439/310; 439/928.1; 248/917; 248/456
[58] Field of Search ......................... 361/683–686; 439/157, 160, 310, 928.1; 312/208.1, 223.1–223.3, 351.1–351.9, 325; 248/127, 128, 447, 466, 479, 917–923, 664, 676, 465, 456

[56] References Cited

U.S. PATENT DOCUMENTS 5,141,196   8/1992   Arnold et al. .................... 248/397
5,292,267   3/1994   Kobayashi et al. ................ 439/310

Primary Examiner—Leo P. Picard
Assistant Examiner—Jayprakash N. Gandhi
Attorney, Agent, or Firm—Pollock, Vande Sande & Priddy

[57] ABSTRACT

Portable computer field kit with a companion docking station. A packaging structure supports a portable computer and printer in a standard carrying case. A rectangular frame includes first and second wells which receive the computer and printer. The first well includes a receptacle assembly which supports a sliding receptacle for engagement with a connector on the computer. An I/O box on the frame connects the computer through the receptacle to an external computer. A docking station is used to support the tablet in an office environment. The docking station includes a computer support hinged to a base. The computer support may be positioned at a plurality of angles with respect to the base. The computer support has a receptacle for engaging a connector of the computer. An I/O box on the base is connected to the receptacle permitting communication between the computer and external computer peripheral devices.

5 Claims, 9 Drawing Sheets

DOCKING STATION FOR A PORTABLE COMPUTER WITH A HINDGED SUPPORT FRAME AND MOVABLE RECEPTACLE ASSEMBLY

This application is a divisional of U.S. patent application Ser. No. 08/303,916, filed Sep. 9, 1994, now U.S. Pat. No. 5,5552,957.

The present invention relates to portable computing systems for field use and which may be used equally well in an office environment.

Various computing systems are finding their way into service as tools for order-taking, sales and/or other marketing functions conducted in the field away from an office environment. The portable computing systems permit a salesman to record a transaction on magnetic media and/or communicate via modem details of the transaction back to a central location. In one application for processing insurance claims, a computer is taken to the site of a casualty loss and the various specifics of a claim are input to the computer system. The computer may then be used to give the customer/claimant a printed receipt of the transaction. Details of the transactions are then forwarded to the home office.

Users of these systems may wish to use the same computing system in the field as a field kit and in an office environment where further information for completing a transaction is entered. The two environments are very different in that the office environment provides more flexibility for creating a computer work station than one necessarily finds in the field. It is therefore desirable to have a computing system which can function effectively in both environments.

Such portable computing systems are shown in UK Patent No. 2 176 322A, U.S. Pat. Nos. 4,790,431, 5,212,628 and 4,837,590, for example. The transportable computing systems described in these references all have various advantages with respect to each other. However, most lack the convenience of a system which will function equally well in the field environment and the office environment.

SUMMARY OF THE INVENTION

It is an object of this invention to provide a packaging structure for a portable computing system.

It is a more specific object of this invention to provide a packaging structure for a computing system which is adaptable to field conditions as well as for full office use.

It is a more specific object of this invention to provide a packaging structure for a portable computing system which includes printing and communicating functions in a field environment.

The present invention provides a packing structure for a portable computer system. The packaging structure includes a field kit for transporting the computer system to a remote site. Details of a transaction taking place at a remote site may be stored in memory, printed out, or communicated by modem to a central computer facility.

In carrying out the invention, the packaging structure for the field kit includes a rectangular frame supported in the carrying case by foam shock absorbing supports. The rectangular frame has first and second shallow wells which receive a portable tablet-configured computer and a printer. The first well of the rectangular frame supports at one end a multi-pin receptacle which moves along the plane of the computer supported within the well. The multi-pin receptacle may be engaged and disengaged with the corresponding computer connector, permitting insertion and removal of the computer from the carrying case. A common I/O box formed on the rectangular frame is electrically connected to the multi-pin receptacle as well as the printer. Input/output data transfers to and from the portable computing system are made through the I/O box.

A companion docking station is also provided to support the computer in an office environment. The docking station supports the computer outside of the carrying case in a convenient operating position and provides access to the computer input/output(I/O) ports so that external data processing devices in the office can be accessed by the computer.

The companion docking station includes a packaging structure which receives the same computer when it is removed from the field kit carrying case and used in an office environment. The docking station includes a computer support hinged to a base, and has at one end the same receptacle as is used in the field kit. The hinged computer support may be positioned at an angle with respect to the base for supporting the computer in any number of preferred operating positions. The base sits on a desk or other work surface and has an I/O box connected via a ribbon connector to the receptacle engaged with the computer connector. Standard computer peripheral equipment may be accessed by the computer through the I/O box.

The portable computing system permits data which might be acquired in the field to be either transferred directly by modem from the field to a home office, or permits the computer to be transported to the office and placed in the docking station to enter additional data or to download previously entered data to a central computer through the I/O box.

DESCRIPTION OF THE PREFERRED EMBODIMENT

Figure 1:
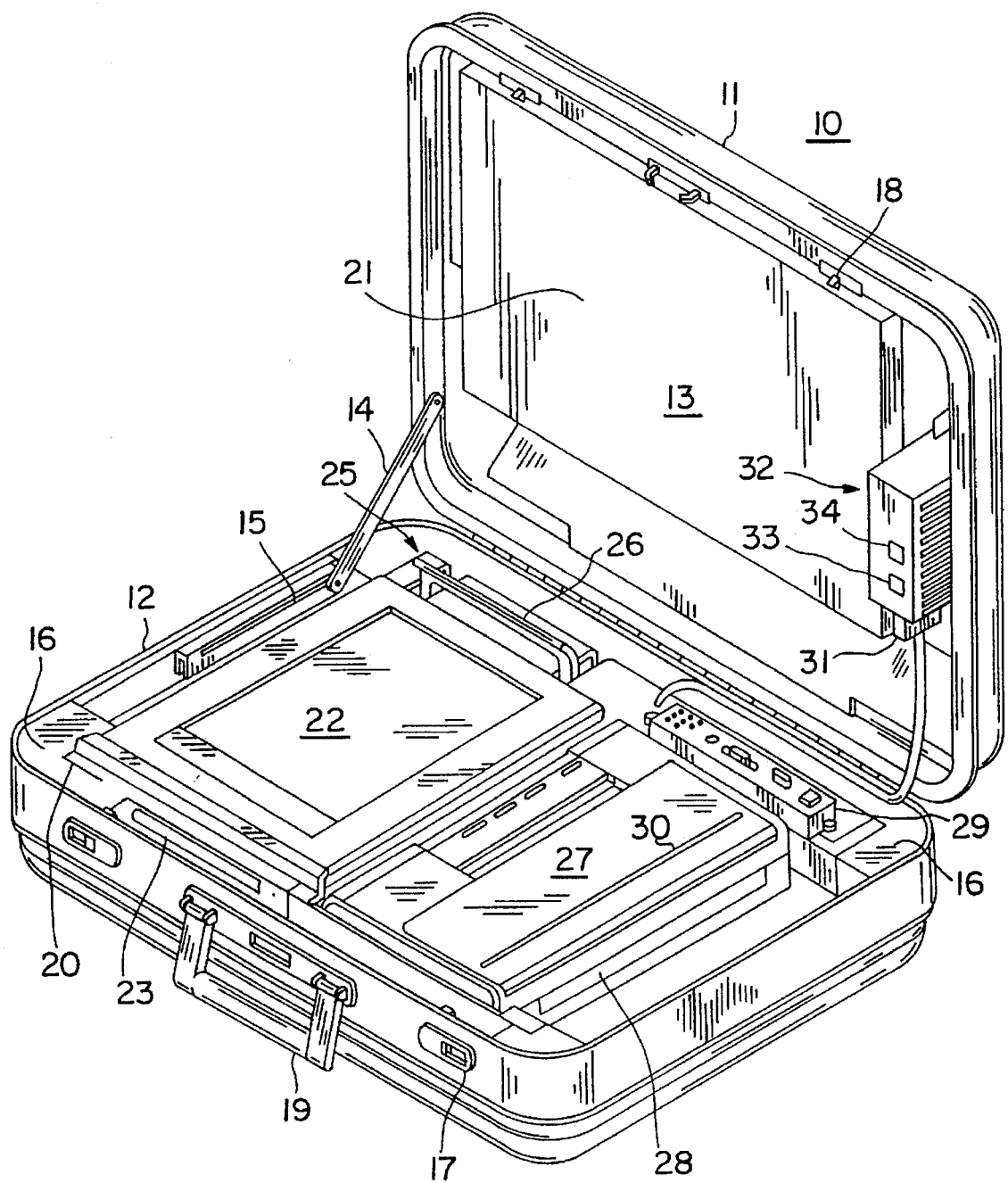
FIG. 1 is an isometric view of the portable field kit in accordance with a preferred embodiment of the invention.

Referring now to FIG. 1, there is shown the portable field kit of a preferred embodiment of the present invention. The field kit includes a carrying case 10 having a lid 11 and base 12. The carrying case 10 includes a hinged compartment 13 for carrying various papers relating to the use of the device. A support 14 and guide 15 hold the lid 11 in the supported position with respect to the base 12. A block of elastomeric foam 21 is attached to the compartment 13. During transport, the lid 11 is maintained closed by the latch 17 and a respective catch member 18. The block of elastomeric foam 21 provides shock damping for the contents of carrying case 10 during transport. A handle 19 is provided on the carrying cases 10.

First and second elastomeric foam supports 16 are included along the longer inside dimension of the carrying case and include four corners which complement the four inside corners of the carrying case. The foam supports support a rectangular frame 20 containing the electronic components of the portable computing system.

The portable computing system comprises an electronic computer 22 which, in the preferred embodiment, is the IBM 730T tablet. The computer tablet 22 includes a screen which is written with an RF probe 23 shaped in the form of a pencil to input commands and data. The RF probe 23 is stored in its own compartment in the computer tablet 22 and is accessible through an opening in the frame 20.

The computer tablet 22 will generate various menu screens once power is enabled. Icons are displayed on the computer tablet 22 and selected by the RF probe 23 as is described in various user manuals available for the IBM 730T computer tablet 22.

A handle 26 is used to force a 200-pin receptacle of a receptacle assembly 25 into or out of engagement with a 200-pin connector on the tablet 22. The receptacle assembly is connected by a ribbon cable 38 to an I/O box 29. Once engaged, the tablet is powered up and transfers data through the receptacle assembly 25 to the I/O box 29.

Supported within a second compartment of the rectangular frame 20 is a printer 27 which is located above a paper tray 28. Paper feeds from the tray 28 through the printer 27 and out through a slot 30.

A cable 31 is shown with a connector which engages a related connector on a modem 32. Modem 32 includes a standard RJ11 connector 33 which connects to the local telephone system. A second RJ11 connector 34 permits a telephone to be connected to the local telephone system.

The portable field kit represented by the preferred embodiment of FIG. 1 provides a complete computing facility in a field environment. For instance, insurance adjusters having such a field kit may enter information via the computer tablet 22 for processing a casualty loss claim on site. This information may be transferred from the field via the modem 32 to the home office, or via the I/O box 29 to a central computing facility once the user returns to his office. Details of the transaction are printed by printer 27 and may be given to the customer on site.

Figure 2:
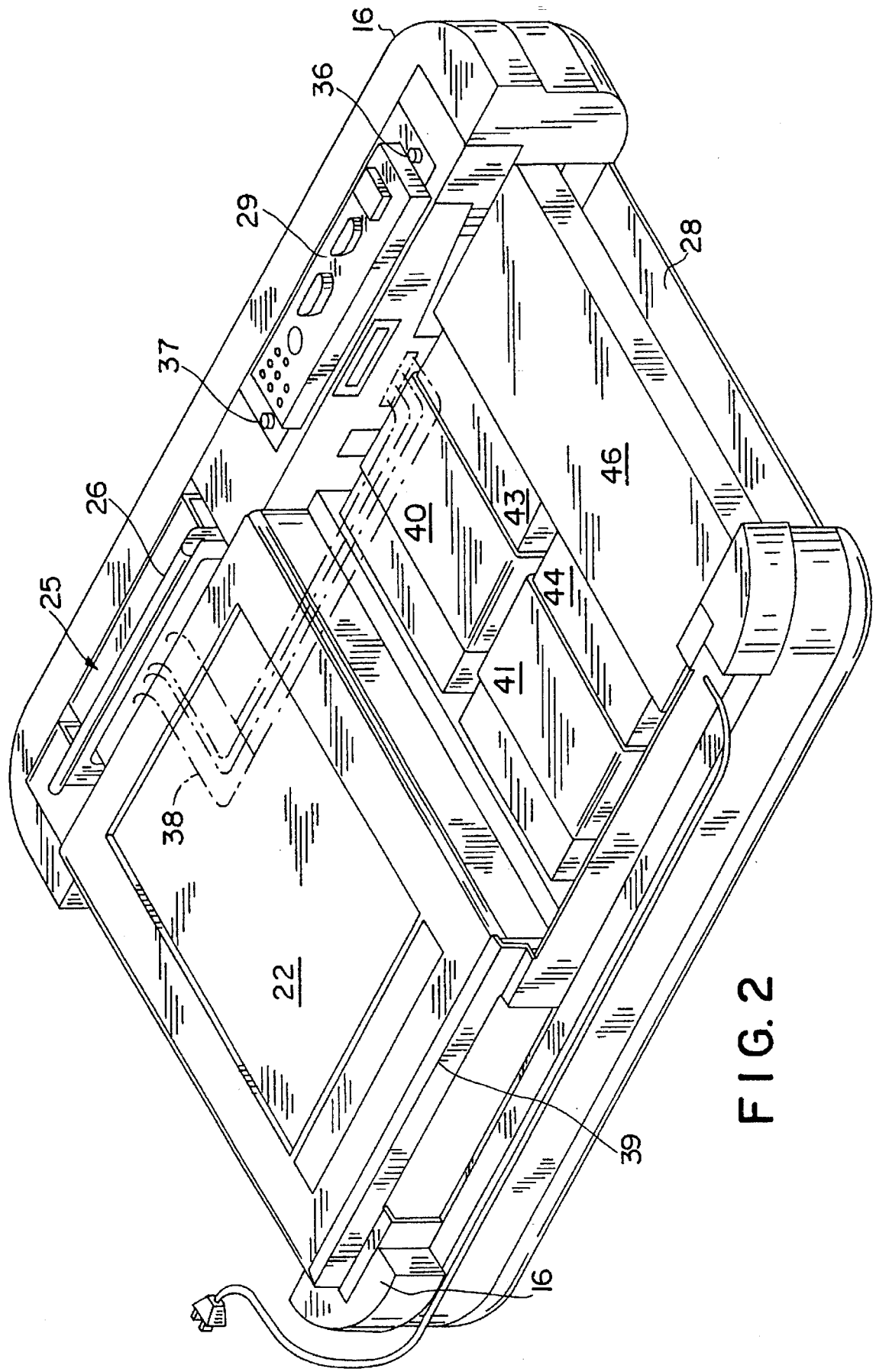
FIG. 2 shows the rectangular frame structure of the field kit and its foam supports which are received in the carrying case of FIG. 1.
Figure 3:
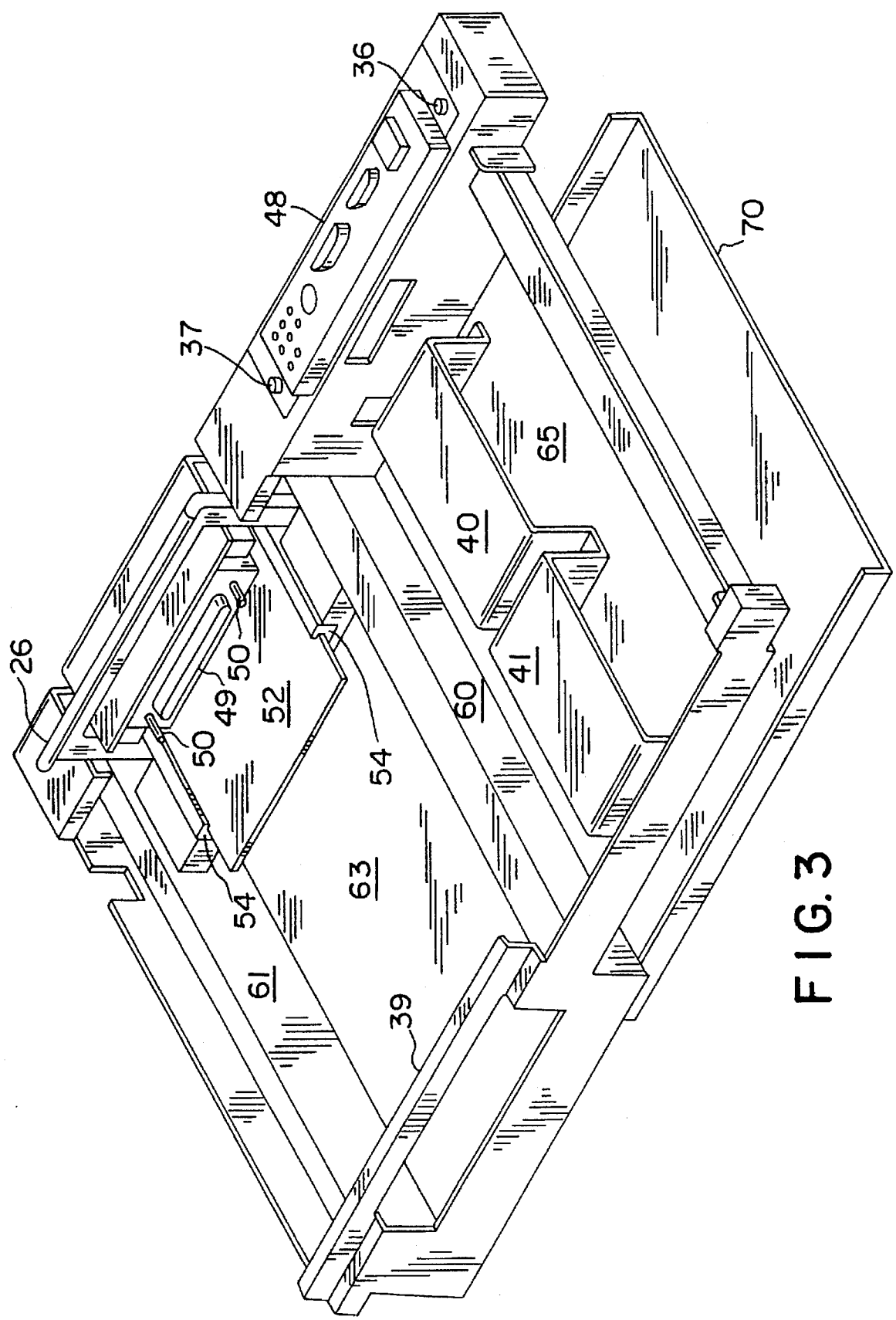
FIG. 3 is an isometric view of the sheet metal welded nest included in the frame structure which supports the electronic components of the computing system.

The field kit of FIG. 1 is organized by a rectangular frame 20. FIGS. 2 and 3 illustrate the rectangular frame structure 20 which may be a weldment. The rectangular frame 20 is shown in FIG. 2 supported in first and second elastomeric foam supports 16 engaged in the longer lateral sides of the rectangular frame 20. Elastomeric supports 16 have corners with radii which complement the radius of the corners in base 12 of the carrying case 10. Elastomeric foam supports 16 provide shock damping for the frame 20 and its supported electronic components.

The rectangular frame 20 shown in FIG. 3 without the elastomeric foam supports 16, provides two wells 63 and 65. The first of these wells 63 receives the computer tablet 22 supported on side walls 60 and 61. Opposite ends of the computer 22 are engaged by a bracket 39 and a receptacle 49 which engages the corresponding 200-pin connector of the computer tablet 22.

A power supply 46 receives the terminals of two batteries 43 and 44 and is connected to a source of AC voltage. The two batteries 43 and 44 slide from the well 63 under the brackets 40 and 41. Terminals of the batteries 43, 44 are engaged with matching terminals on power supply 46. The I/O box 29 is supported in a rear channel 48 formed on one side of rectangular frame 20.

The I/O box 29 is supported by a flange which receives thumb screws 36, 37 which thread through slots in the rectangular frame 20 into nut plates on the far side. The I/O box 29 can be moved forward and rearward approximately one-half an inch to permit a printer receptacle to be engaged and disengaged with the printer connector. Connections are made from power supply 46 to a printed circuit card on the front of I/O box 29. An additional power connector on a short length of cable 35 is shown which supplies voltage from the power supply to the printer 27.

The receptacle assembly 25 includes a receptacle 49 having guide pins 50. The receptacle is mounted on a slide 52, which moves horizontally within the guides 54 in the plane of computer 22. Guides 54 are in turn mounted to the side walls 60 and 61 of the well 63.

Thus, the connector 49 may be slid horizontally into engagement with the computer tablet 22 connector. The opposite end of computer tablet 22 is retained under the lip of the bracket 39, as the connector of the computer tablet is engaged by the sliding receptacle 49. A handle 26 pivoted to the receptacle 49 provides the leverage necessary to engage and disengage the 200-pin receptacle 49 with the connector 57 of the computer tablet 22.

Also shown in FIG. 3 is a paper tray 70 which is plastic and which may be made by vacuum-forming. The tray 70 is attached to the carrying case base 12. The paper tray 70, being plastic, will deform if the device is dropped, thus reducing the transfer of shock from the base of the carrying case 10 to rectangular frame 20, computer 22 and printer 27.

Figure 4A:
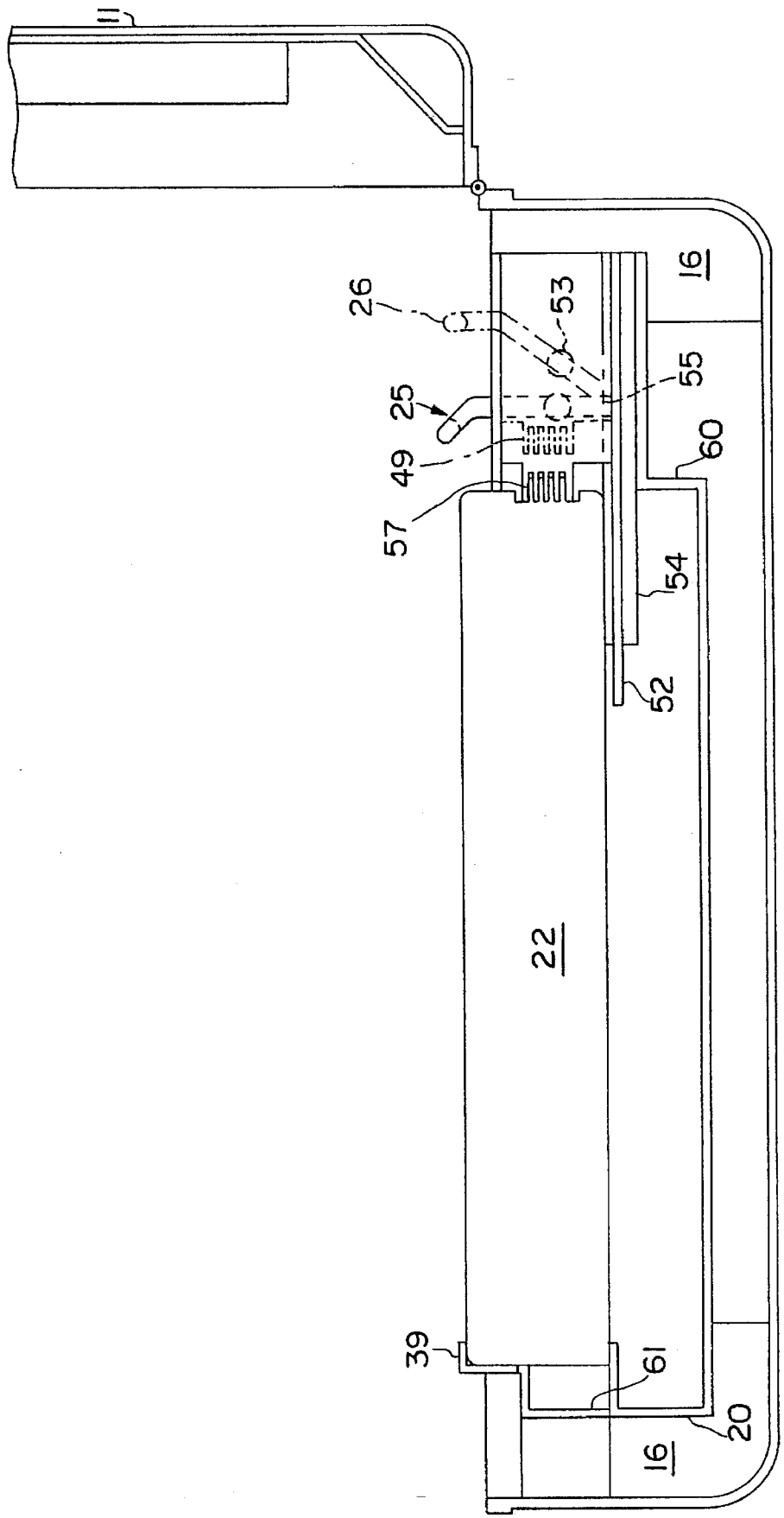
FIG. 4A is a section view illustrating the sliding receptacle assembly which connects to the computer connector and an I/O box.

FIG. 4A is a section view of rectangular frame 20 which illustrates the operation of the connector assembly 25. The computer tablet 22 is inserted into the well 63 by first engaging the computer tablet with the bracket 39. The remaining end of the computer tablet 22 is then lowered and supported on the walls 60, 61. The receptacle 49 is brought into engagement with the connector 57 of computer tablet 22 by moving the handle 26 forward. The handle 26 is pivoted to both ends of the receptacle, and moves from the position illustrated in phantom in FIG. 4A to the engaged position with computer tablet 22. A pair of holes 55 in guides 54 facilitates the engagement of the receptacle 49 by capturing the end of the arms of handle 26, increasing in the leverage applied by handle 26 to receptacle 49. During disengagement of the receptacle 49, the same holes 55 assist in creating leverage by handle 26 to break the engagement of the receptacle 49 and computer 22 connector 57. The receptacle 49 supported by slide 52 moves in the plane of the computer 22 and frame 20.

Figure 4B:
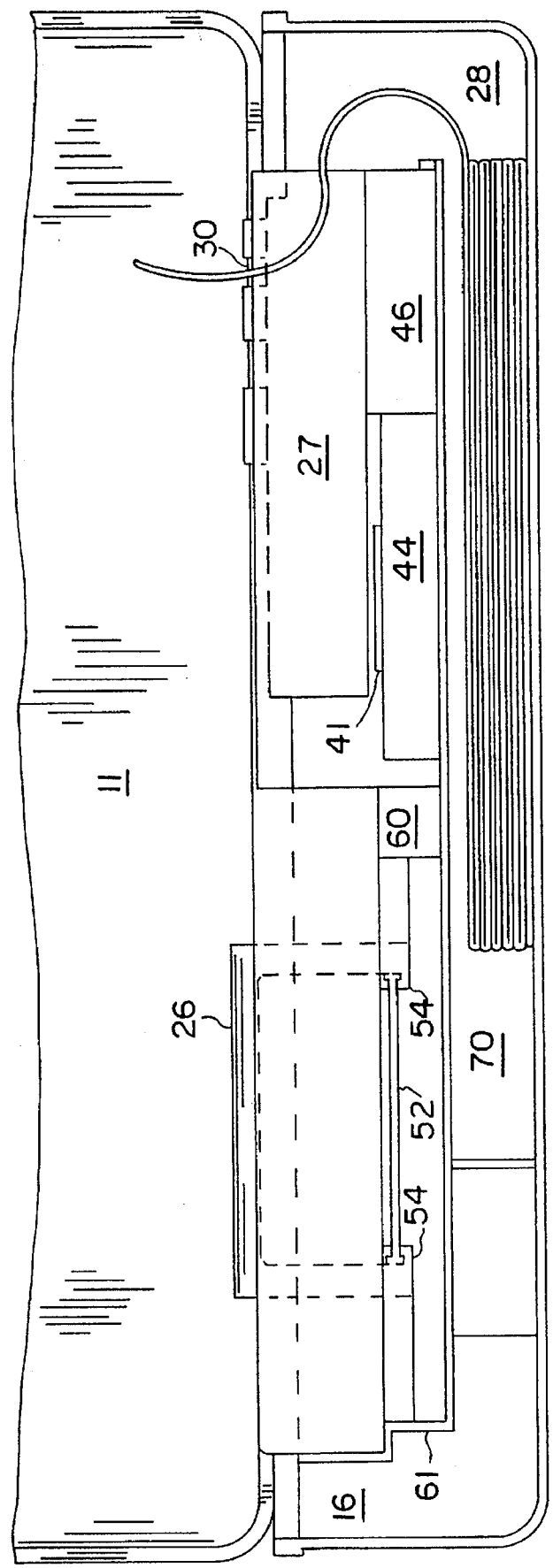
FIG. 4B is a section view of the portable computing system which illustrates the paper tray.

FIG. 4B illustrates a section view showing the printer 27 and paper tray 70 arrangement which occupies the second well 65 of rectangular frame 20. The paper tray 28 supports the quantity of paper which threads through the printer 27 and exits the slot 30 as a printed document.

The foregoing portable field kit is useful in those applications wherein data entries must be made away from the office.

Figure 5:
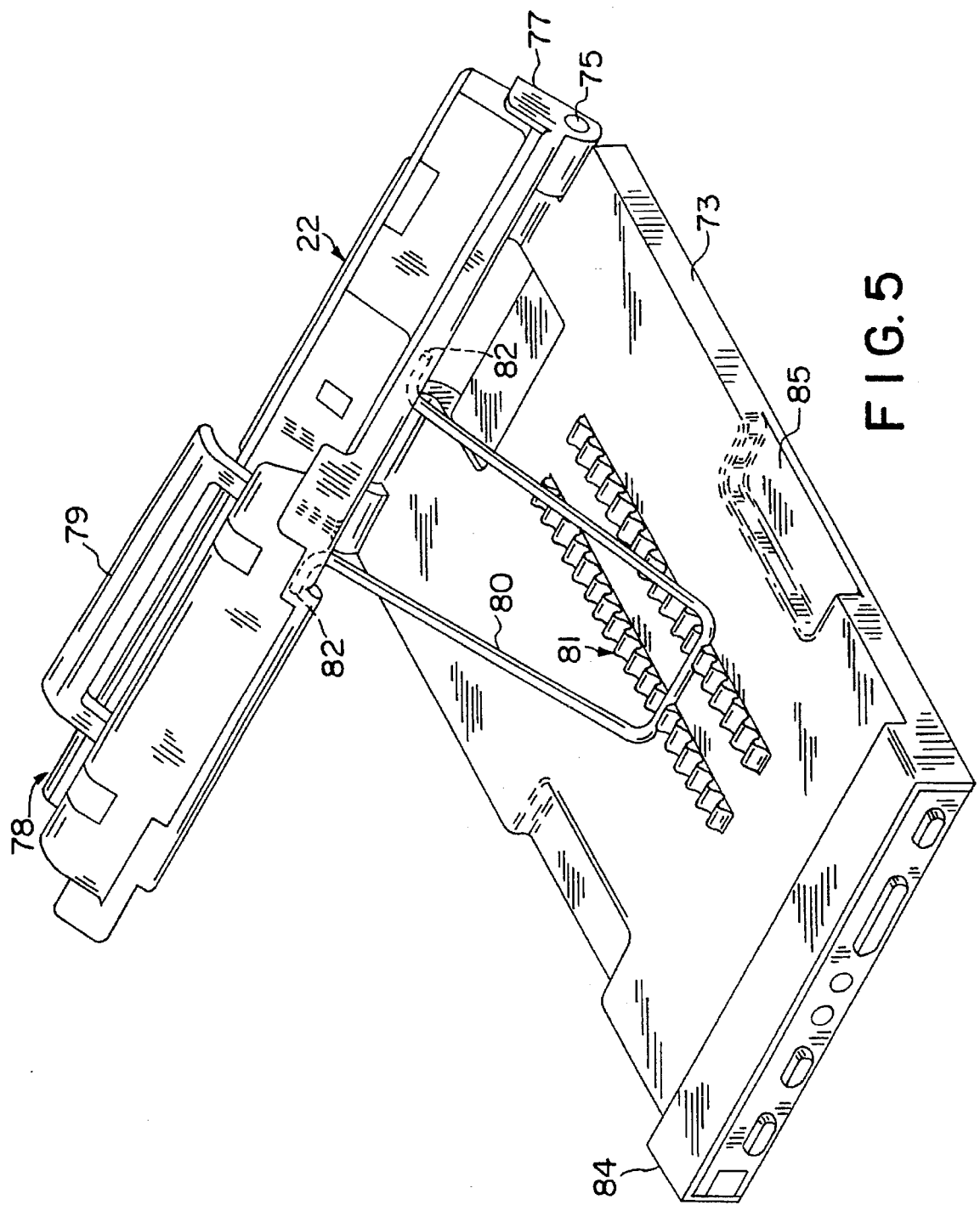
FIG. 5 is a first isometric view of the docking station which supports the computer in an office environment.
Figure 6:
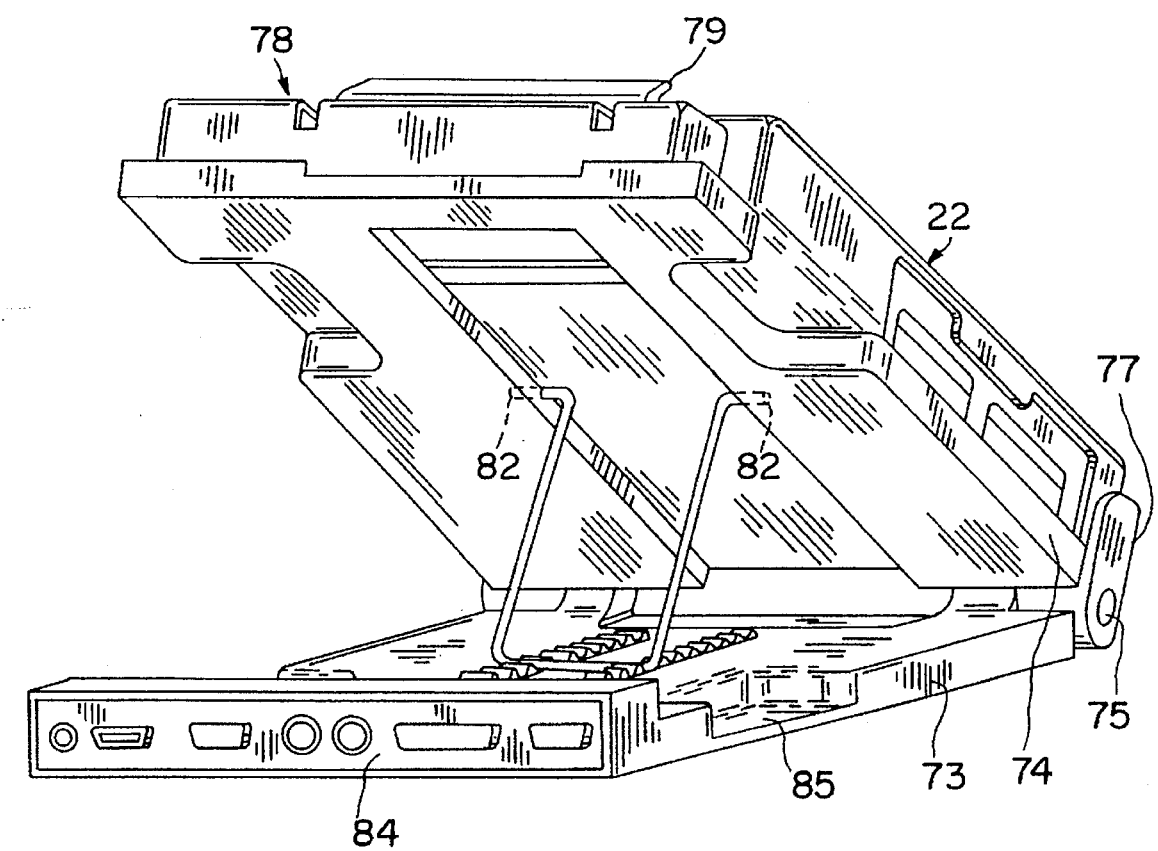
FIG. 6 is a second isometric view of the docking station.
Figure 7:
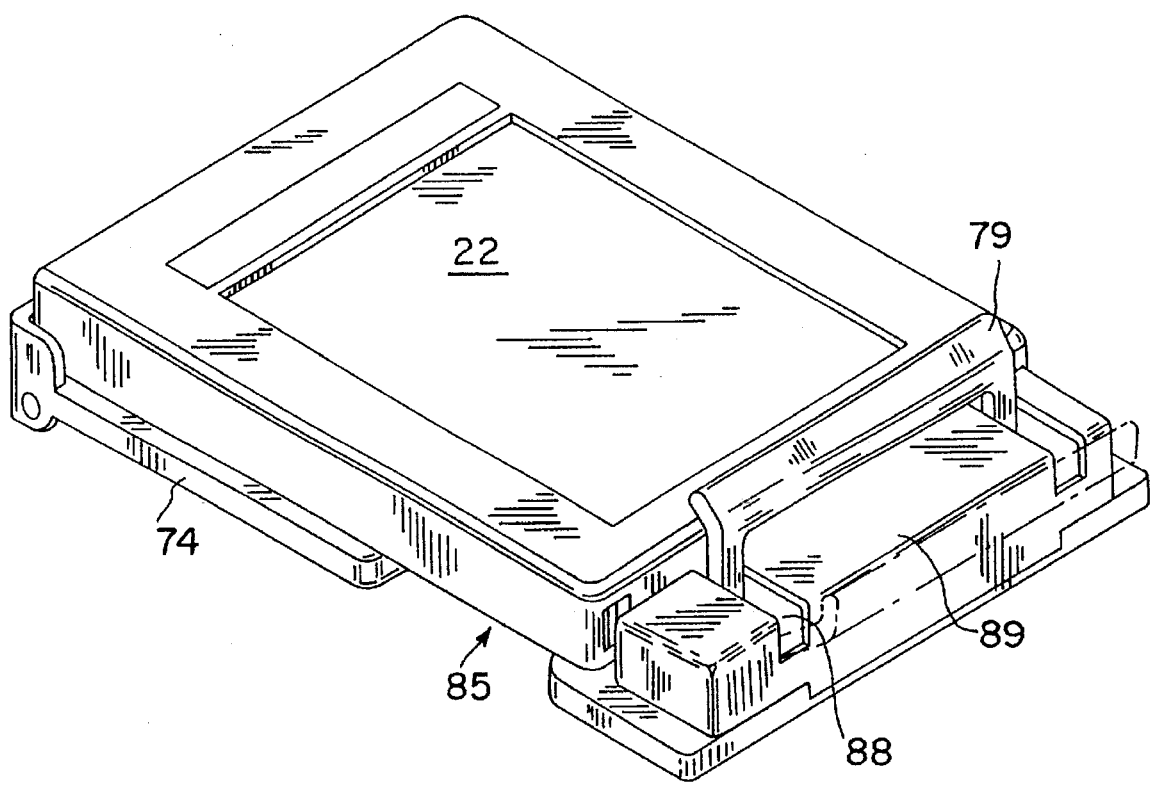
FIG. 7 is an isometric view which shows the docking station receptacle which engages the computer connector.

A docking station is shown in FIGS. 5, 6 and 7 which will permit the computer tablet 22 to be removed from the field kit of FIG. 1 and used on a desk. Once the user has returned to an office environment, the computer tablet 22 is removed from the field kit and its contents are downloaded to a central computer. Thus, in the case of claim management, wherein claims are adjusted at the field site using the kit of FIG. 1, the information comprising this transaction may be downloaded at the user's office. Software upgrades may also be uploaded to computer 22. The docking station supports the computer tablet 22 at a plurality of different angles with respect to a flat horizontal surface.

The docking station comprises a base 73 which is hinged to a computer support 74. The computer support 74 is preferably maintained in position by a U-shaped rod 80 which engages a pair of linear teeth of the linear tooth array 81 formed in the base 73. Support rod 80 has ends 82 captivated in the support 74. The U portion of support rod 80 is received in a pair of the teeth 81 to maintain the computer tablet 22 at a desired angular position with respect to base 73.

Computer tablet 22 rests at one end against a pair of angle brackets 77 formed at one end of the support 74. The opposite end of the computer tablet 22 includes a connector 57 which engages with a receptacle 94 of a receptacle assembly 78. Receptacle 94 corresponds to the receptacle 49 used in the field kit of FIGS. 1-4A, 4B. As will be evident from the Figures which follow, the receptacle is engaged and disengaged by handle 79 with the connector 57 of the computer tablet 22 in the same manner as the field kit.

The base 73 includes a pair of cutouts 85 which permit the base 73 and support 74 to be separated.

An I/O box 84 is shown at one end of the base member 73. The I/O box 84 includes connections which terminate on a printed circuit card extending within the base 73. A flexible cable extends from the receptacle assembly 78 through support 74 and is routed about hinge 75, terminating on the printed circuit board. connected to the input/output ports of I/O box 84. In this way, complete access to the computer tablet connections is obtained via the I/O box 84. Upon returning to the office environment, the computer tablet 22 is removed from the field kit and placed in the docking station support 74 against the angle brackets 77. The receptacle assembly 78 is then engaged with the computer connector 57, and the contents of the computer tablet 22 may be downloaded via a port of an I/O box 84 to a central computing facility. Additionally, the tablet may be used with other peripherals connected through the I/O port 84 such as printers, display devices and mass storage devices.

Figure 8A:
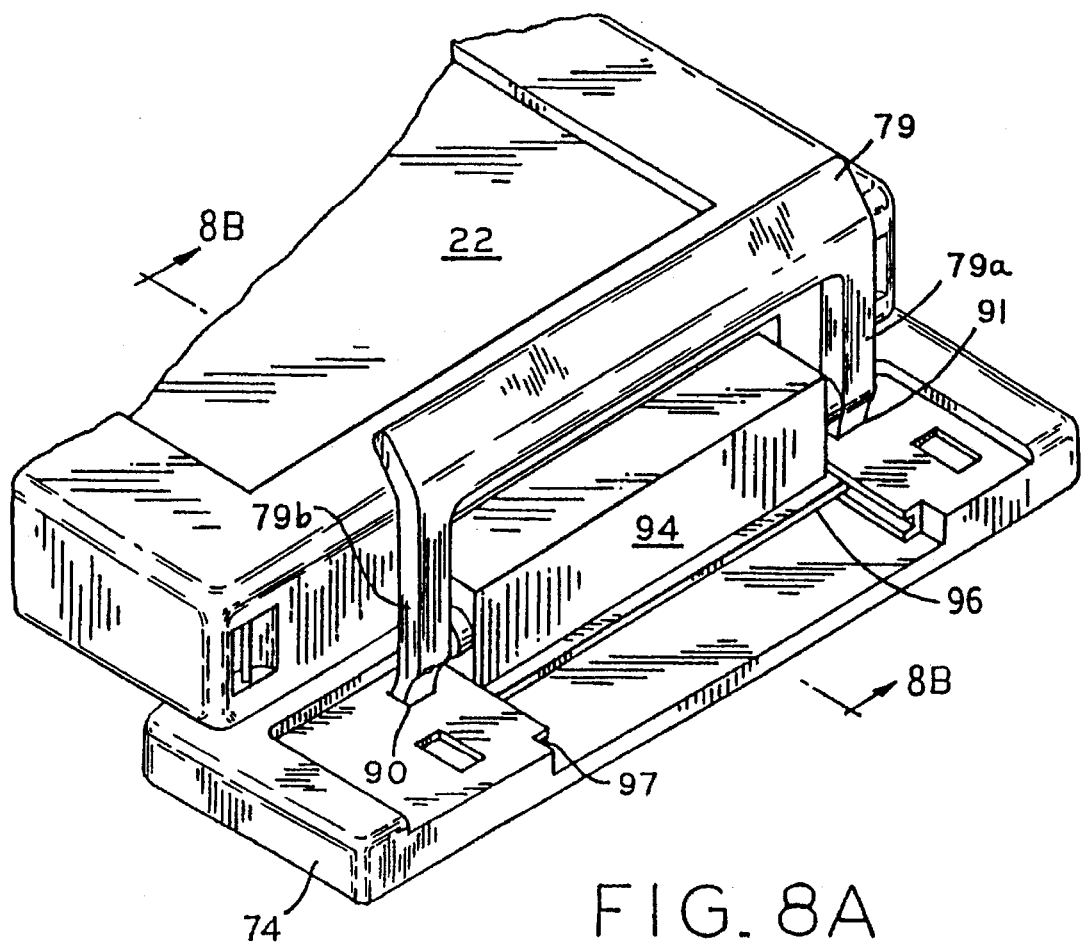
FIG. 8A is an isometric view of the docking station receptacle engaged with the computer connector.
Figure 8B:
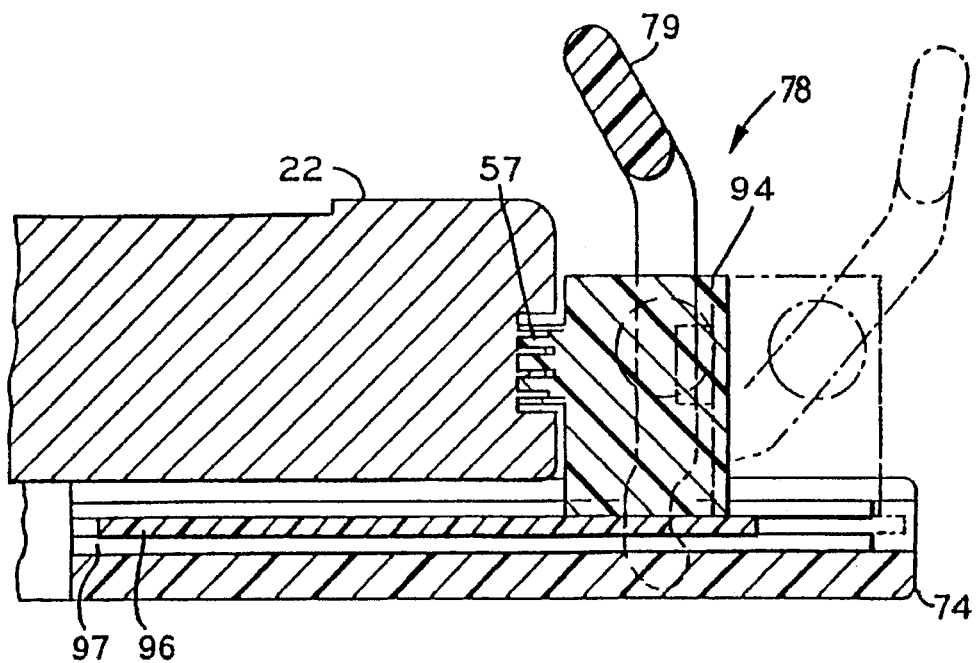
FIG. 8B is a section view of the receptacle in its engaged and disengaged condition.

The receptacle assembly 78 is shown more particularly in FIGS. 7, 8A and 8B. The support 74 includes at one end a cover 89 having slots 88 which receive ends of the handle 79. The 200-pin receptacle 94 is supported on slide 96 which is received within guides 97 and 98. Handle 79 is pivotally connected along its arms 79a and 79b to receptacle 94. Holes 90, 91 in guides 96 and 97 (shown in FIG. 8A which has cover 89 removed) capture the ends of arms 79(a) and 79(b) of handle 79 and permit the user to gain leverage in moving the receptacle 94 into and out of engagement with the connector 57 of computer tablet 22. As is known to those familiar with engaging multi-pin connectors, considerable force is necessary to engage and disengage such connectors with their corresponding receptacles.

The docking station and field kit operate together as a system in a portable computer. Using these components of a single system, it is possible to efficiently gather data and conduct transactions away from the office as well as in the office.

Thus, there has been described with respect to one embodiment, a portable computing system. Those skilled in the art will recognize yet other embodiments of the invention described more particularly by the claims which follow.

What is claimed is:

1. A positioning structure for a portable computer comprising:
    a base member;
    a support frame hinged at one end to one end of said base member for supporting said portable computer, including at said one end a pair of right angle supports for bearing against corners of said portable computer, said support frame being positionable at a desired angle with respect to said base member;
    a receptacle assembly mounted to an opposite end of said support frame, including a multiple pin receptacle which receives a corresponding connector of said computer, said receptacle being movable from a first non-engagement position to a second engagement position which forces said computer against said right angle supports; and
    an input/output port on said base member connected to said receptacle for providing input/output functions for said portable computer.

2. The positioning structure of claim 1, wherein said receptacle is mounted on a slide which is supported in first and second guides formed in said support frame, and includes a handle having first and second arms pivotally connected to opposite ends of said receptacle, said arms having ends which engage openings in said support frame for forcing said receptacle and slide to move within said guides.

3. The positioning structure of claim 2 further comprising means for fixing said support frame at an angle to said base member.

4. The positioning structure of claim 3, wherein said means for fixing said support frame position with respect to said base member comprises a U-shaped rod, having first and second ends pivotally connected to the underside of said support frame, and a plurality of linear teeth on said base for receiving said U-shaped rod and supporting said support frame at a plurality of angular positions with respect to said base member.

5. The positioning structure of claim 1 wherein said input/output port is located on an I/O box on an end of said base member opposite said hinged one end.

* * * * *